United States Patent
Inokuchi et al.

(10) Patent No.: US 6,912,190 B2
(45) Date of Patent: Jun. 28, 2005

(54) OPTICAL DISC APPARATUS AND METHOD FOR READING INFORMATION FROM AN OPTICAL DISK HAVING TRACKS AND SPACES BETWEEN THE TRACKS ON WHICH ADDRESS INFORMATION IS RECORDED

(75) Inventors: Chikashi Inokuchi, Hirakata (JP); Kenji Koishi, Sanda (JP); Kohjyu Konno, Takatsuki (JP); Yutaka Osada, Fujisawa (JP); Mitsuhiko Oohta, Yokohama (JP); Takashi Kawai, Sagamihara (JP)

(73) Assignees: Matsushita Electric Industrial Co., Ltd., Osaka (JP); Victor Company of Japan Limited, Kanagawa (JP)

(*) Notice: Subject to any disclaimer, the term of this patent is extended or adjusted under 35 U.S.C. 154(b) by 591 days.

(21) Appl. No.: 09/987,384

(22) Filed: Nov. 14, 2001

(65) Prior Publication Data

US 2002/0067676 A1 Jun. 6, 2002

(30) Foreign Application Priority Data

Nov. 15, 2000 (JP) ........................................ 2000-348203

(51) Int. Cl.[7] ............................................... G11B 7/00
(52) U.S. Cl. ................................. 369/59.15; 369/124.12
(58) Field of Search ........................ 369/59.15, 124.12, 369/47.22, 47.28, 53.34, 47.17, 53.33, 47.25, 47.27, 47.35, 47.31

(56) References Cited

U.S. PATENT DOCUMENTS

| | | | | |
|---|---|---|---|---|
| 5,491,682 A | * | 2/1996 | Dohmeier et al. | 369/124.12 |
| 5,508,991 A | * | 4/1996 | Onigata et al. | 369/44.13 |
| 5,610,886 A | * | 3/1997 | Hayashi et al. | 369/44.29 |
| 5,696,742 A | * | 12/1997 | Ogata et al. | 369/47.22 |
| 5,936,921 A | * | 8/1999 | Iimura | 369/47.25 |
| 6,081,490 A | | 6/2000 | Kuroda et al. | |
| 6,195,320 B1 | * | 2/2001 | Furumiya et al. | 369/47.2 |
| 6,487,149 B1 | * | 11/2002 | Yokoi et al. | 369/47.25 |
| 6,519,214 B1 | | 2/2003 | Hikima | |
| 6,563,773 B1 | * | 5/2003 | Yanagisawa et al. | 369/44.41 |
| 6,643,239 B2 | * | 11/2003 | Nakajo | 369/53.26 |

FOREIGN PATENT DOCUMENTS

| | | | |
|---|---|---|---|
| EP | 0 930 617 | 7/1999 | |
| JP | 10-134386 | 5/1998 | |
| JP | 10-293926 | 11/1998 | |
| JP | 02118923 A | * 5/1999 | ............ G11B/7/09 |
| JP | 11-203785 | 7/1999 | |
| JP | 2000-113463 | 4/2000 | |

* cited by examiner

Primary Examiner—William Klimowicz
Assistant Examiner—Peter Vincent Agustin
(74) Attorney, Agent, or Firm—Wenderoth, Lind & Ponack, L.L.P.

(57) ABSTRACT

An optical disc apparatus reads the address information from an optical disc which has tracks and track spaces formed between tracks. The apparatus has an optical head which irradiates the disc with light and includes tracking detectors, divided into a first detector and a second detector in a track direction, detecting the light reflected from the disc and outputting detection signals, an adjusting circuit which adjusts amplitudes of the first and second detection signals and outputs the signals at a position where the address information is recorded, a differential amplifying circuit which outputs the differential signal which is the difference between the adjusted first and second detection signals, and an address detecting circuit which detects the address information based on the differential signal. As a result, the optical disc apparatus accurately detects whether information is being recorded on a correct track and improves the reliability during recording.

8 Claims, 9 Drawing Sheets

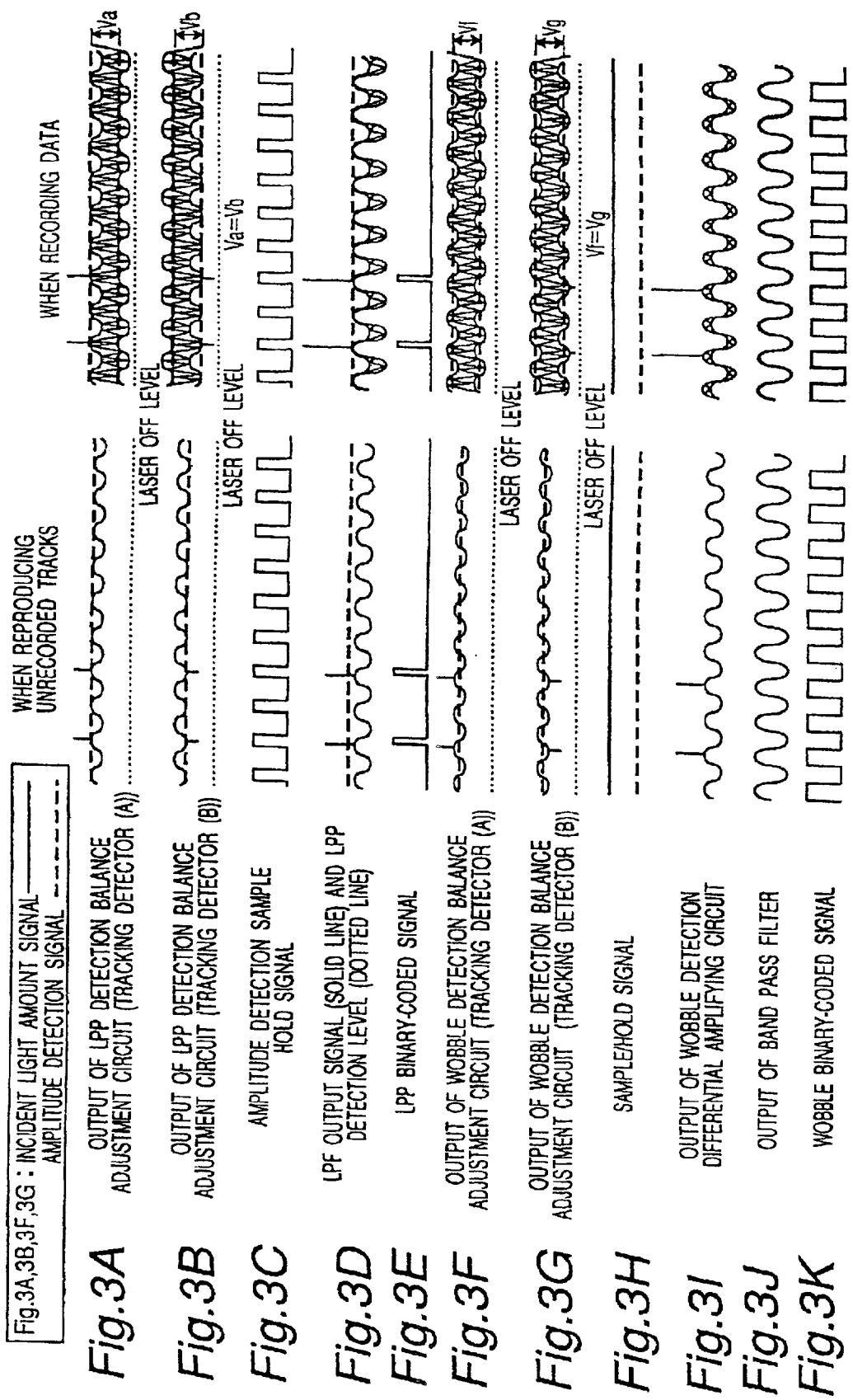

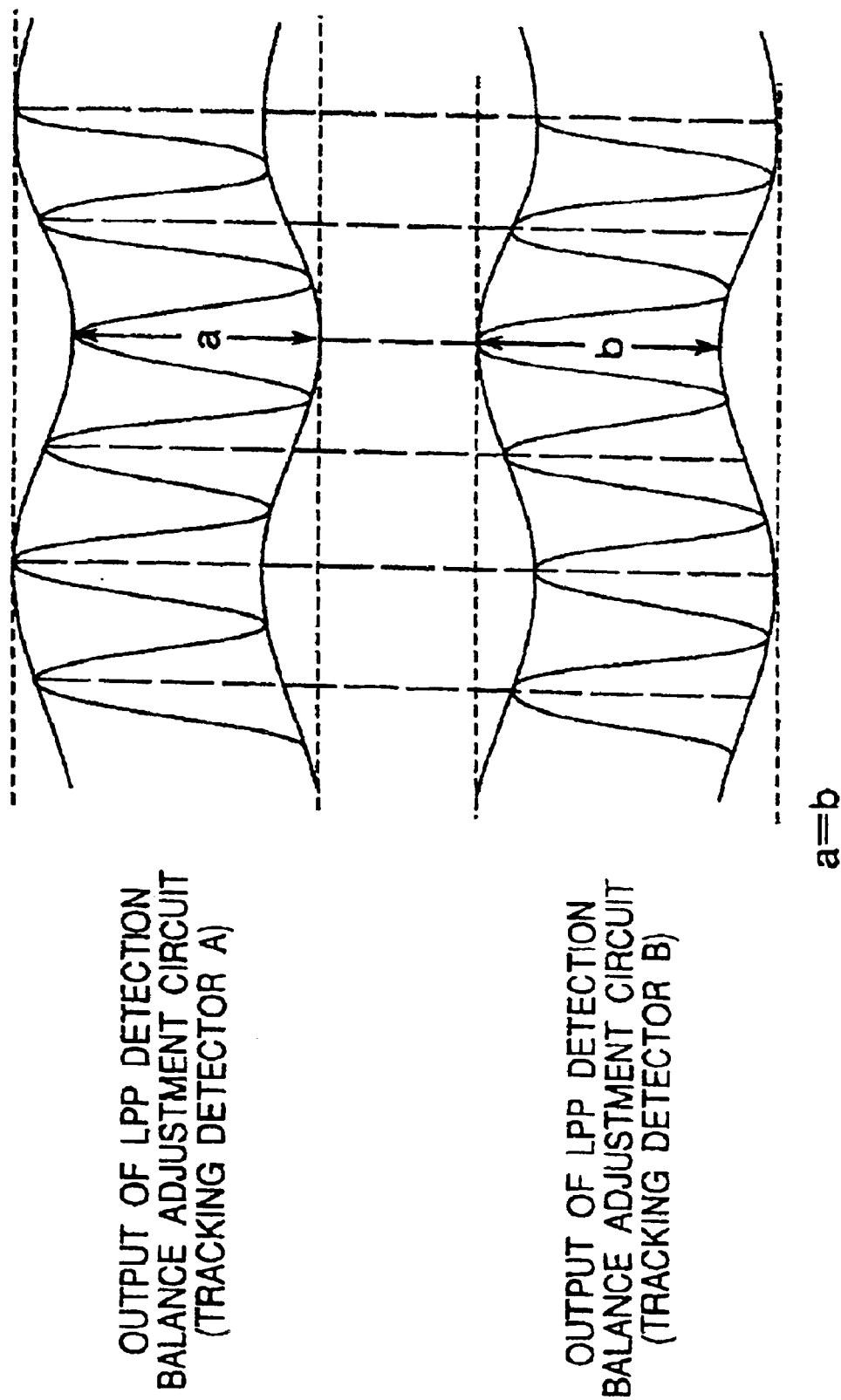

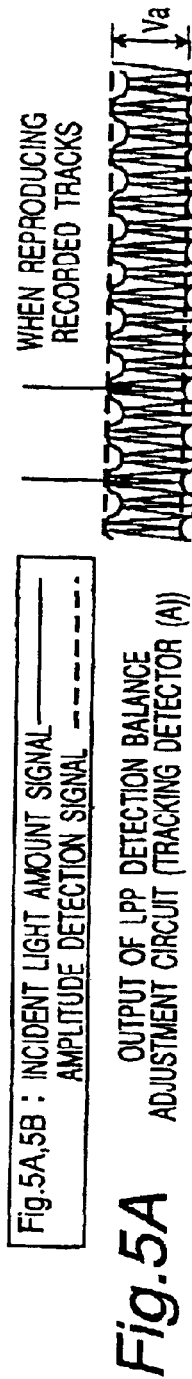
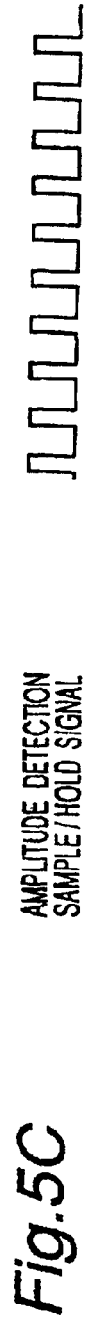
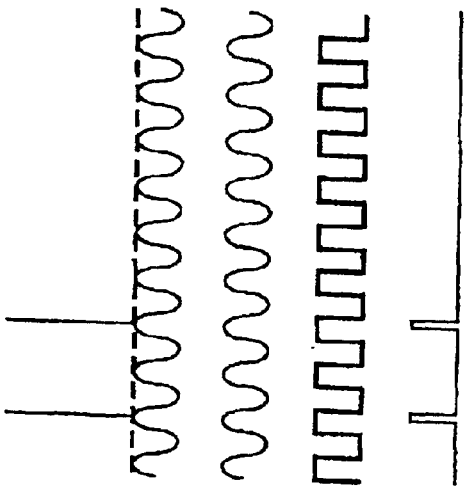

Fig.5A,5B : INCIDENT LIGHT AMOUNT SIGNAL ———
AMPLITUDE DETECTION SIGNAL - - - - -

Fig.5A  OUTPUT OF LPP DETECTION BALANCE
ADJUSTMENT CIRCUIT (TRACKING DETECTOR (A))

Fig.5B  OUTPUT OF LPP DETECTION BALANCE
ADJUSTMENT CIRCUIT (TRACKING DETECTOR (B))

Fig.5C  AMPLITUDE DETECTION
SAMPLE/HOLD SIGNAL

Fig.5D  LPF OUTPUT SIGNAL (SOLID LINE) AND LPP
DETECTION LEVEL (DOTTED LINE)

Fig.5E  OUTPUT OF BAND PASS FILTER

Fig.5F  WOBBLE BINARY-CODED SIGNAL

Fig.5G  LPP BINARY-CODED SIGNAL

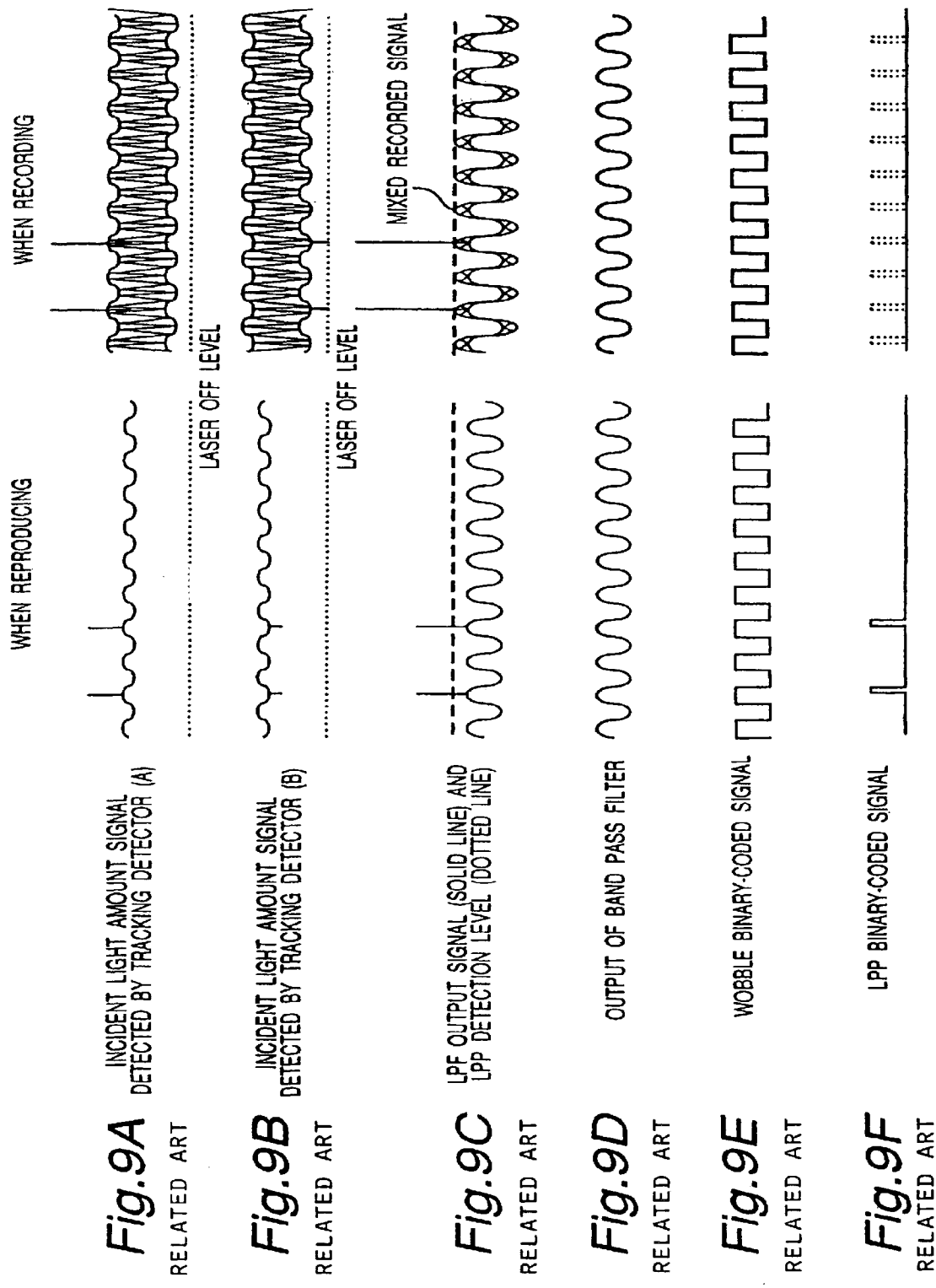

OPTICAL DISC APPARATUS AND METHOD FOR READING INFORMATION FROM AN OPTICAL DISK HAVING TRACKS AND SPACES BETWEEN THE TRACKS ON WHICH ADDRESS INFORMATION IS RECORDED

BACKGROUND OF THE INVENTION

The present invention relates to a technique for recording and reproducing signals recorded in a digital disc.

There are DVD-R/RW as formats of optical discs for recording and reproducing information. The primary feature of these formats lies in the address information required for identifying the address in recording and reproducing information which is formed on land portions of the disc in order to improve compatibility with the DVD-ROM format. A track is a region of the optical disc in which the information to be reproduced is recorded as marks. The address information is formed at the space section (also called the land) between guiding grooves (also called grooves) of the disc, to which information to be reproduced is recorded. This address is also called "land pre-pit address" or "LPP address." At the time of tracking the recorded track(s), tracking detectors of the apparatus-detect the incident light and generate a plurality of signals representing light amount (hereinafter referred to as "light amount signal(s)"). The address information is detected based on a differential signal which is taken from the difference of light amount signals. The secondary feature of the above-mentioned format is wobbles provided in the optical disc, in which the guiding grooves are oscillated in the radial direction of the disc by a predetermined frequency. The wobble signal obtained based on the wobble is used as a reference signal for generating clocks for recording and reproducing the information. Same as address information detection, the wobble is also detected based on the differential signal which is taken from the difference between light amount signals.

Referring now to FIGS. 8 and 9A–9F, the configuration and operation of a conventional optical disc apparatus will be described.

FIG. 8 is a block diagram of a conventional optical disc apparatus 80 which records/reproduces information to/from a DVD-R/RW disc 101. The optical disc apparatus 80 comprises a disc motor 102, an optical head 103 that has focusing detectors, a reproduction signal detector, and tracking detectors for detecting light, a servo signal/reproduction signal generating circuit 104 for generating a focus error signal, tracking error signal, and reproduction signal based on the light amount signals from the detectors, a focus/tracking control section 105 for allowing the optical head 103 to keep tracking guiding grooves of the optical disc 101 using the output signal of the servo signal/reproduction signal generating circuit 104, a differential amplifying, circuit 106 for generating wobble signal/land pre-it address signal from the light amount signals of the tracking detectors of the optical head 103, a band pass filter 107 for extracting the wobble signal component from the output signal of the differential amplifying circuit 106, a wobble signal binary-coding circuit 108 for binarizing a wobble signal, which is an output signal of the band pass filter 107, and a wobble PLL circuit 109 . for generating clocks required for recording/reproducing the information recorded on the disc 101 from the wobble binary-coded signal.

Furthermore, the optical disc apparatus 80 comprises an amplitude detecting circuit 110 for detecting the amplitude of the wobble signal extracted from the band pass filter 107, a bias generating circuit 111 for generating the bias voltage, a low pass filter 112 for detecting the land pre-pit address from the output signal of the differential amplifying circuit 107, a land pre-pit detecting circuit 113 for detecting the land pre-pit address signal based on a certain voltage level as a comparison level, which is obtained by adding a generated voltage from the bias generating circuit 111 and an amplitude signal of the wobble signal, a land pre-pit address detecting circuit 114 for detecting the land pre-pit address from the land pre-pit binary signal detected at the land pre-pit detecting circuit 113, a reproduction signal binary-coding circuit 115 for binarizing a reproduction signal generated in the servo signal/reproduction signal generating circuit 104, a data reproducing PLL circuit 116 for generating clocks for demodulating the output signal of the reproduction signal binary-coding circuit 115, a demodulating circuit 117 for carrying out demodulation using the data and clocks generated by the data reproducing PLL circuit 116, an error correcting/adding circuit 118 for adding the correction code to user data received through interface of a personal computer, etc. connected to the apparatus 80 or correcting the demodulated data using the correction code at the time of data reproduction, and a modem control circuit 119 for transmitting the data with the error correction code added to a modulation circuit 120 or transmitting the data from the demodulation circuit 117 to the error correction/addition circuit 118 and for controlling the modulation circuit/demodulation circuit 117, 120.

Furthermore, the optical disc apparatus 80 comprises the modulation circuit 120 for modulating the user data to which the correction code is added, a laser drive waveform generating circuit 121 for generating the laser drive waveform from the output signal of the modulation circuit 120, a laser drive circuit 122 for driving the laser, a gate signal generating circuit 123 for generating the timing signal required for recording and reproducing the data. and a central processing unit (hereinafter referred to as "CPU") 124 for controlling the overall apparatus 80.

Referring now to FIGS. 9A–9F, the operation of the optical disc apparatus 80 will be described. First of all, description will be made -on binary-coding of the land pre-pit address at the time of reproducing the information. FIGS. 9A–9F show waveforms of output signals from the tracking detectors when the optical disc apparatus 80 (FIG. 8) keeps tracking the guiding groove of the DVDR/RW format disc 101. The waveforms at the time of tracking an unrecorded track are shown in the right side of FIGS. 9A through 9F. Assume that the optical head 103 (FIG. 8) of the optical disc apparatus 80 is equipped with two. tracking detectors A and B (for example, see FIG. 2). Because the tracks on the disc are modulated in the radial direction, the light amount signals on the detector repeatedly increase and decrease at a predetermined frequency by the modulation. Furthermore, pulse-form detection signals are observed at a predetermined position of the modulated signal by the address information (i.e., land pre-pit address) recorded on the land section.

The differential amplifying circuit 106 (FIG. 8) of the optical disc apparatus 80 generates differential signals of FIGS. 9A and 9B. The differential signal is further passed to LPF 112 (FIG. 8) for removing noise of the high-pass components or reducing influence of recording signals at the time of recording. As a result, signals shown in FIG. 9C are obtained. For the detection level to detect the land-prepit address signal, a voltage level obtained by adding the signal amplitude voltage of the wobble signal extracted by the band pass filter 107 (FIG. 8) and a predetermined voltage generated by the bias generating circuit 111 (FIG. 8) is adopted. FIG. 9F shows the waveform of the land pre-pit binary-coded signal thus obtained. The LPP address detecting circuit 114 demodulates and detects the land pre-pit address based on the land pre-pit address signal, wobble binary-coded signal, and the clock signal generated at the wobble PLL.

Continuously referring to FIGS. 9A–9F, the operation when the optical disc apparatus 80 (FIG. 8) records the information is described. The waveforms when the information is recorded are shown with waveforms on the right side of FIGS. 9A through 9F. The optical disc apparatus 80 detects signals by reducing gains of the detecting circuit inside the optical head 103 (FIG. 8) which has a function for converting the current that flows the tracking detectors to the voltage in order to prevent the circuit from being saturated even at the high recording power at the time of recording.

When information is being recorded, the tracking detectors of the optical head 103 (FIG. 8) detects the recording signal. More precisely, the optical head 103 (FIG. 8) does not detect the wobble modulated signal and LPP address signal themselves, but detects the wobble modulated signal and LPP address mixed with recording signals. FIGS. 9A and 9B (when recording) indicate the light amount signals when detected by the tracking detectors A and B. The differential amplifying circuit 106 (FIG. 8) of the optical disc apparatus 80 generates differential signals shown in FIGS. 9A and 9B. FIG. 9C shows the signal waveform that passes the LPF 112 (FIG. 8). The LPF 112 (FIG. 8) is equipped for reducing the mixed recording signal. However, as shown in FIG. 9C, it is understood that influences of mixed recording signals remain in the signal waveforms after passing through the LPF 112 (FIG. 8).

Even in recording, the detection level of the land pre-pit is determined in such a manner so as to detect the land pre-pit address. As shown with a dotted line of FIG. 9C, the detection level is set nearly equivalent to the maximum amplitude level of the signal waveform with the recording signal mixed. However, with this configuration, a large number of pseudo-pulses are detected in the land pre-pit binary-coded signals (FIG. 9F). As a result, the detection ratio of LPP address at the LPP address detecting circuit 114 (FIG. 8) lowers. What must be taken into account is that the land pre-pit address detection ratio lowers when the detection level is increased in order to avoid erroneous detection. The reason is that at the low-power section when recording power modulation is carried out, the case in which the land pre-pit address is unable to detect occurs.

Furthermore, since in this detection system, the differential signal of the signals detected by the tracking detectors of the optical head 103 (FIG. 8) is used in order to detect the LPP address, the address detection ratio greatly varies in accordance with the off-track condition of the optical head 103. This is because, at the time of recording, the light amount signals reflected by the optical disc 101 (FIG. 8) and returned to the tracking detectors become unbalanced by the off-track condition, and the condition of the differential signal is greatly changed.

In addition, the tertiary feature of the above-mentioned format is that the information can be recorded by installments. According to this format, it is possible to additionally record the data by identifying the record initiating position by the processing called linking from the last section to which the information was recorded. The conventional optical disc apparatus 80 (FIG. 8) detects-track jumps at the time of recording based on the tracking error signal. The reason is that the address detection ratio at the time of recording is low and the danger of causing track jump, etc. and recording the data in other addresses must be avoided. However, when the track jump of the optical head is detected by using the tracking error signal, there may be misdetection. For example, the error signal is detected greatly due to eccentricity, etc. of the disc. To avoid such misdetections, a comparison level of the tracking error signal for determining whether a track jump has occurred or not should be set higher in order to properly detect track jumps. Thus, it is important to increase the address detection ratio.

Since in the conventional optical disc apparatus 80 (FIG. 8) the LPP address detection ratio during recording or reproducing the recorded tracks lowers, there are not many methods to detect whether or not the apparatus was recording the data in the correct track by detecting a primarily tracking error signal, and especially, the reliability during recording was low. In addition, depending on the off-track condition of the optical head, there was a problem of further lowering the LPP address detection ratio.

SUMMARY OF THE INVENTION

It is an object of the present invention to provide an optical disc apparatus that correctly detects whether the apparatus is recording the data in the correct track and improves the reliability during recording.

In the present invention, a differential amplifier for wobble detection and a differential amplifier for LPP address detection are separately disposed. Thus, by adjusting the balance of the differential amplifier for LPP address detection based on the recording and reproducing conditions of the apparatus, the LPP address can be detected at a high detection ratio. Furthermore, because the differential balance for wobble detection is adjusted by monitoring the jitter amount of the wobble signal, the wobble signal of improved quality can be detected.

To be more precise, the optical disc apparatus according to the present invention is an optical apparatus for reading the address information from an optical disc which has, for example, groove tracks for recording information and land tracks formed between the groove tracks on which the address information for identifying the position on the optical disc is recorded. The optical disk apparatus comprises an optical head for irradiating the optical disc with a laser along the track direction and is equipped with a first tracking detector and a second tracking detector that-are divided and each for detecting the reflecting light from the optical disc and outputting detection signal, a balance adjusting circuit for address detection for receiving the first detection signal outputted by the first detector and the second detection signal outputted by the second detector, adjusting the amplitudes of the first detection signal and the second detection signal and outputting them, respectively, at the position where the address information is recorded, an address detection differential amplifying circuit for outputting the address detection differential signal which is the difference between the first detection signal and the second detection signal adjusted by the balance adjusting circuit for address detection, and an address detecting circuit for detecting the address information based on the address detection differential signal outputted from the address detection differential amplifying circuit. By this configuration, the above-mentioned object is achieved. The guiding grooves of the disc are modulated in the radial direction by the frequency which becomes the reference signal of clocks required for reproducing and recording the information. According to the present invention, by separately installing the differential amplifying circuit for detecting a modulation signal and the differential amplifying circuit for detecting an LPP address signal, wobble signal and LPP address signal can be ideally detected. Consequently, in the optical disc (DVD-R/RW, etc.) with address information formed on the land tracks for recording on the groove tracks, the detection ratio of address information can be remarkably improved irrespective of the recording and reproducing conditions of the apparatus.

The optical disc may further comprise a gain control circuit that makes amplitudes of first and the second detection signals constant.

By further adding an AGC circuit that controls gains and makes signal amplitudes of high-frequency components of light amount signals detected by the tracking detectors constant, the LPP address reading margin can be increased against disturbance factors such as defocus, off-track, tilt, etc. of the optical head or the disc.

Operations of the present invention are described as follows.

The first aspect of the present invention adjusts, by using the balance adjusting circuit for address detection for adjusting amplitudes of signals which are detected by the tracking detectors at the position where the address information (LPP address information) is recorded, the balance of inputted signals, i.e., the first detection. signal outputted by the first detector and the second detection signal outputted by the second detector, to the address detection differential amplifying circuit. Thus, at the recording position of LPP address information, mixing of the recorded signals or recording signals during the recoding operation of the apparatus can be minimized, and the detection ratio of the LPP address information can be increased irrespective of the recording or reproducing conditions of the apparatus.

The second aspect of the invention provides a specific configuration of balance adjustment of the balance adjusting circuit for address detection that can minimize mixing of the information signal recorded or the recording signal during the recording operation of the apparatus at the position where the LPP address signal is recorded and can improve the LPP address detection ratio.

The third aspect of the invention provides another specific configuration for balance adjustment of the balance adjusting circuit for address detection that can increase the LPP address detection ratio in the first optical apparatus.

The fourth aspect of the invention has the disc guiding-groves already modulated in the radial direction by the frequency which serves as the reference signal of clocks required for reproduction and recording of the information and enables the wobble signal and LPP address signal to be ideally detected by being separately provided with the wobble detection differential amplifying circuit for detecting the modulated signal and the differential amplifying circuit for detecting the LPP address.

The fifth aspect of the invention allows the balance adjusting circuit for wobble detection to adjust the signal balance so that the wobble signal jitter is minimized in the optical disc apparatus of the fourth aspect.

The sixth aspect of the invention provides a specific configuration for adjusting the balance of the balance adjusting circuit for wobble detection based on the reading ratio (detection ratio) of the land pre-pit address in the optical disc apparatus of the fourth aspect.

The seventh aspect of the invention can expand the LPP address reading margin against disturbance factors such as defocus, off-track, tilt, etc. of the optical head or the disc by further adding an automatic gain control circuit.

BRIEF DESCRIPTION OF THE-DRAWINGS

These and other object and features of the present invention will become clear from the following description taken in conjunction with the preferred embodiments thereof with reference to the accompanying drawings, in which:

FIGS. 3A–3K are waveforms of the operation of the optical disc recording and reproducing apparatus in an embodiment of the present invention;

FIG. 4 is a diagram of two output signals of the LPP detection balance adjusting circuit;

FIGS. 5A–5G are waveforms of the operation of an optical recording and reproducing apparatus in an embodiment of the present invention;

Figure 7:
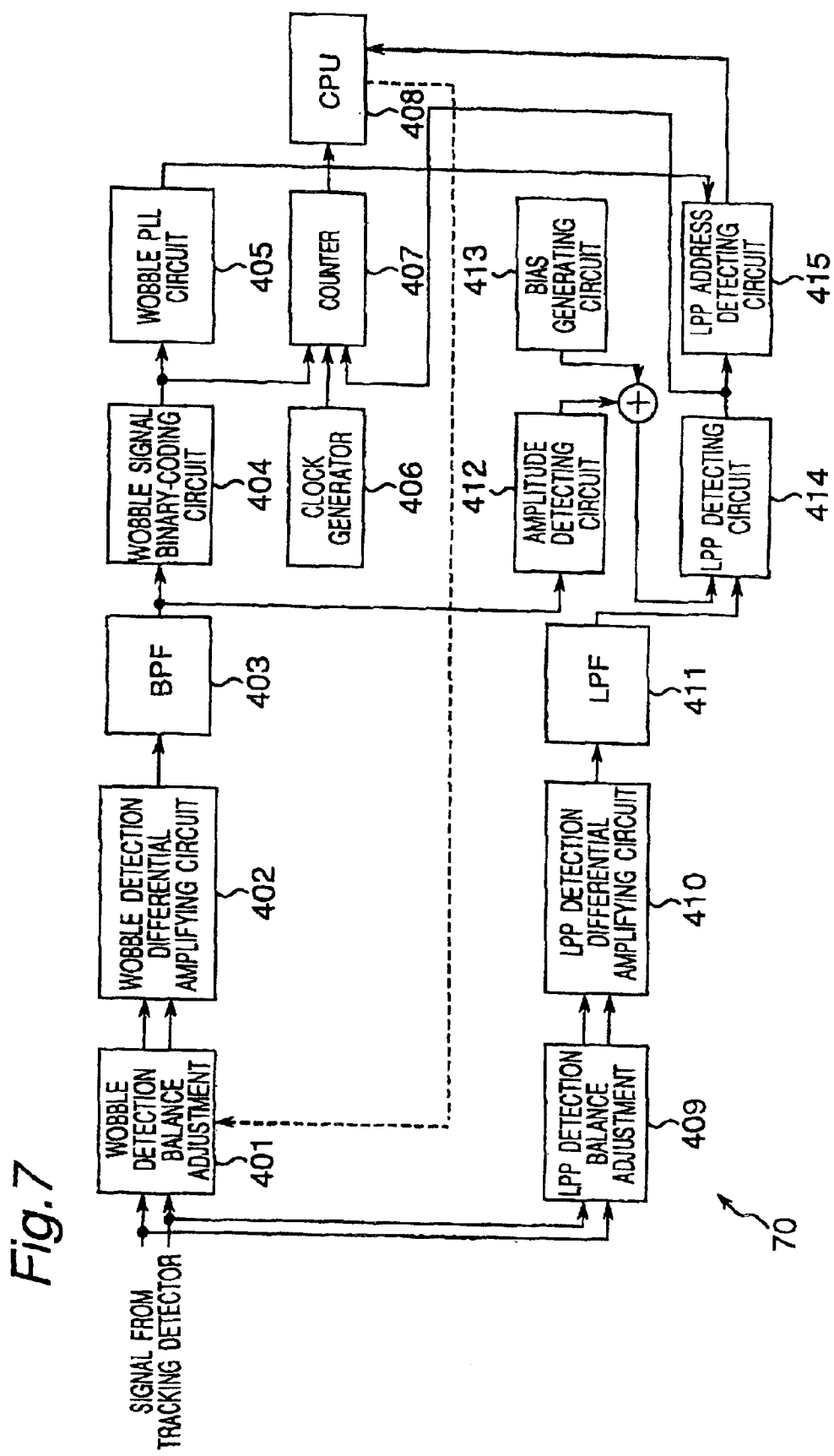
Figure 8:
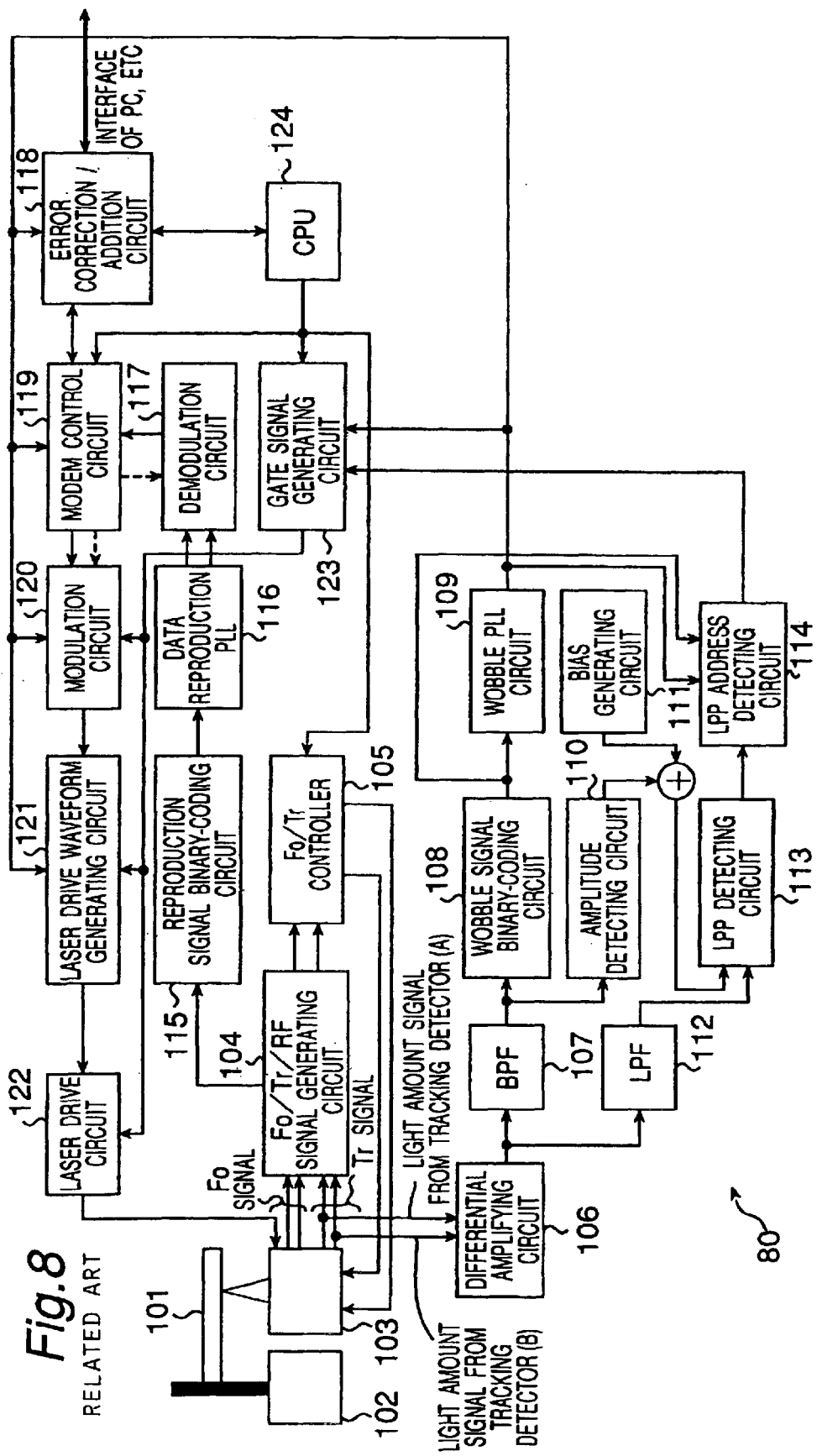

FIG. 7. is a partial block diagram of an optical recording and reproducing apparatus in an embodiment of the present invention;

FIG. 8 is a block diagram of a conventional apparatus; and

FIGS. 9A–9F are waveforms of the operation of the conventional apparatus.

DETAILED DESCRIPTION OF THE PREFERRED EMBODIMENTS

Figure 1:
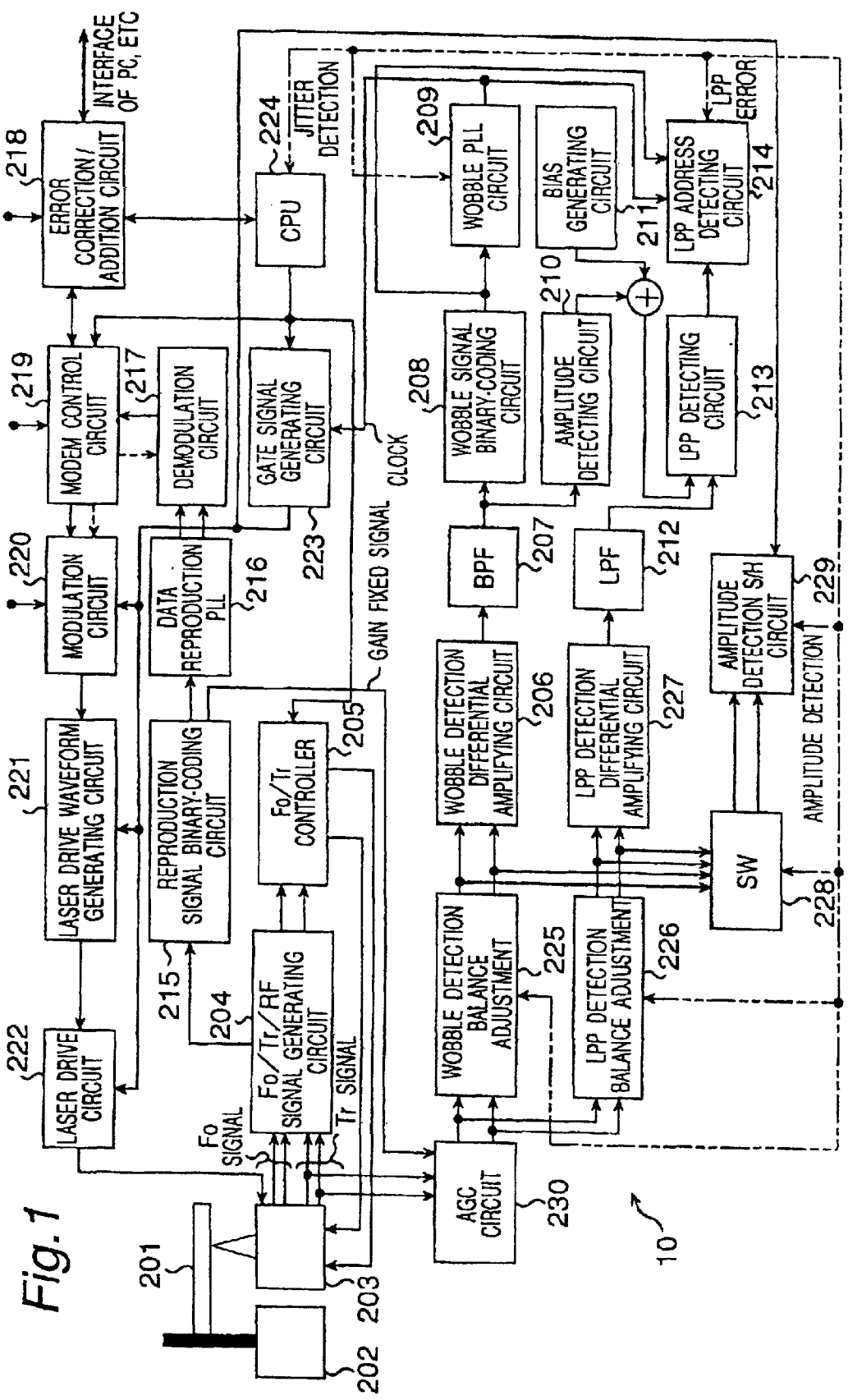
FIG. 1 is a block diagram of an optical disc recording and reproducing apparatus in an embodiment of the present invention.

Referring now to the attached figures, an embodiment of the present invention will be described in detail. FIG. 1 is a block diagram of an optical disc recording and reproducing apparatus 10 in an embodiment of the present invention. Now, each component of the optical disc recording and reproducing apparatus 10 will be described. The optical disc recording and reproducing apparatus 10 records/reproduces the information to/from an optical disc (for example, DVD-R/RW disc) 201. The optical disc recording and reproducing apparatus 10 comprises a disc motor 202, an optical head 203 equipped with focusing detectors, a reproduction signal detector, and tracking detectors for detecting the light, a servo signal/reproduction signal generating circuit 204 for generating a focus error signal, tracking error signal, and reproduction signal from the light amount signals from the detectors, a focus/tracking control section 205 that allows the optical head 203 to keep tracking the guiding grooves of optical disc 201 using the output signal of the servo signal/reproduction signal generating circuit 204, a differential amplifying circuit 206 for generating a wobble signal from the output. signal of a wobble detection balance adjusting circuit 225, a band pass filter (BPF) 207 for extracting wobble signal components from an output signal of the differential amplifying circuit 206, a wobble signal binary-coding circuit 208 for binarizing the wobble signal, which is the output signal of the band pass filter 207, and a wobble PLL circuit 209 for generating clocks required for carrying out recording/reproduction of the data from the wobble binary-coded signal.

The optical recording and reproducing apparatus 10 further comprises an amplitude detecting circuit 210 for detecting amplitudes of the wobble signal at the band pass filter 207, a bias generating circuit 211 for generating the bias voltage, a low pass filter (LPF) 212 for extracting low frequency components for detecting the land pre-pit address from the output signal of a LPP detection differential amplifying circuit 227, a land pre-pit detecting circuit 213 for binarizing outputs of the low pass filter 212 and detecting the land pre-pit address signal based on a certain voltage level as a comparison reference level, which is obtained by adding a generated voltage from the bias generating circuit 211 and an amplitude signal of the wobble signal, a land pre-pit address detecting circuit 214 for detecting land pre-pit address from a land pre-pit address signal (binary-coded signal) detected by the land pre-pit detecting circuit 213, a reproduction signal binary-coding circuit 215 for detecting the presence of the recorded signal from the reproduction signal produced at the servo signal/reproduction signal generating circuit 204 and further reproducing the recorded information signal, a data reproducing PLL circuit 216 for generating clocks for demodulating an output signal of the reproduced signal binary-coding circuit 215, a demodulating circuit 217 for carrying out demodulation using the data and clocks generated by the data reproducing PLL circuit 216, an error correcting/adding circuit 218 for adding the correction code to the user recorded data through an interface of a personal computer, etc. connected to the apparatus, or correcting the demodulated data by the use of the correction code when the data is being reproduced, and a modem control circuit 219 that transmits, to the modulation circuit 220, the data with the error correction code added or transmits the data from the demodulation circuit 217 to the error correcting/adding circuit 218, and controlling the modulating circuit/demodulating circuit 220, 217.

The optical disc recording and reproducing apparatus 10 further comprises the modulating circuit 220 for modulating the user data with the correction code added, a laser drive waveform generating circuit 221 for generating a laser drive waveform from an output signal of the modulation circuit 220, a laser drive circuit 222 for driving the laser, a gate signal generating circuit 223 for generating a timing signal required for recording/reproducing the data, a CPU 224 for controlling the whole apparatus, a wobble detection balance adjusting circuit 225 for adjusting the balance of the signals inputted to the wobble detection differential amplifying circuit 206, an LPP detection differential amplifying circuit 227, an LPP detection balance adjusting circuit 226 for adjusting the balance of the signals inputted to the LPP detection differential amplifying circuit 227, a signal selector switch 228 for changing over the signal to be inputted to the wobble detection differential amplifying circuit 206 and LPP detection differential amplifying circuit 227 to input into an amplitude detecting circuit 229, the amplitude detecting circuit 229 for detecting upper/lower envelopes of the output signal of the signal selector switch 228 and holding the amplitude information in the timing from the gate signal generator 223, and outputting to CPU 224, and an automatic gain control circuit (hereinafter referred to as "AGC circuit") 230 for making signal amplitudes of high-frequency components of the light amount signals detected by the tracking detectors (FIG. 2) of the optical head 203 constant The AGC circuit 230 is effective for the instability of address detection due to the off-track condition of the optical head 203, and minimizes the light amount fluctuation by the off-track condition. Note that the AGC circuit 230 operates based on the presence of the recorded signal detected by the reproduced signal binary-coding circuit 215, and at the section of the unrecorded track, the AGC circuit 230 operates as a fixed gain amplifier. It is also noted that the amplitude detecting circuit 229, to be more precise, has a function for detecting the amplitude at the specific phase position of wobble in which the LPP address is recorded.

Figure 2:
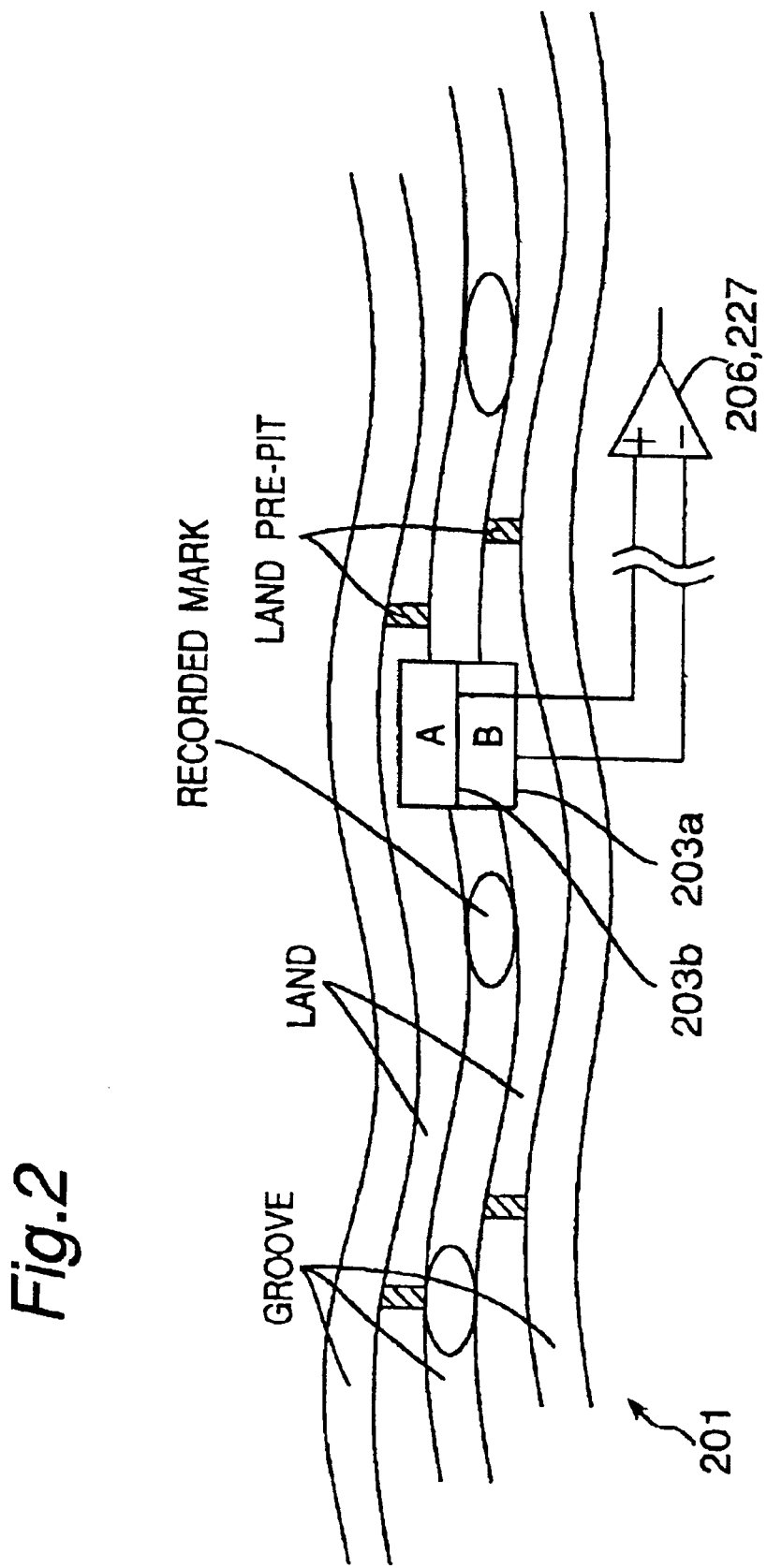
FIG. 2 is a diagram of the groove form of the disc.

Before explaining the operation of the optical disc recording and reproducing apparatus 10, the optical disc 201 referred to in the present invention is described. FIG. 2 is a diagram of the disc groove shape. In the disc 201, land is formed between one groove and the other groove. On the land, a land pre-pit is formed, and in the groove, a recording mark is formed. The radial undulation of the groove, which is a recording groove, is called wobble in the present specification, and is used for detecting the linear velocity of the disc. That is, in the present specification, the wobble is used for generating the recording clock or is used for constant linear velocity (CLV) control. Note that in the figure, the radial direction indicates the perpendicular direction of a line nearly parallel to the land or groove. In the DVD-R disc and DVD-RW disc, the wobble cycle is 186 times the recording clock cycle. In addition, the land pre-pit has address information encoded and is used to detect an accurate position on the disc.

FIG. 2 shows a detector 203a installed to the optical head 203. The detector 203a is divided into two tracking detectors A and B by a dividing line 203b in the direction along the track (track direction). In other words, along the circumferential direction of the optical disc 201, two tracking detectors A and B exist. The two detectors A and B detect and output the light amount of laser light irradiated from the optical head 203 and reflected at the optical disc 201, respectively. The outputs of detectors A and B are entered in the wobble detection differential amplifying circuit 206 or LPP detection differential amplifying circuit 227 after they undergo a predetermined process, and are converted to the differential signal that indicates the difference and utilized. The detector 203a may be divided into a still greater number (for example, 4 pieces and 6 pieces) of detectors. Even in such event, a set of two detectors divided with respect to the dividing line along the track may be grasped as the two detectors A and B mentioned above.

The feature of the present invention lies in the separate installation of the differential amplifier 227 for LPP address detection and the differential amplifier 206 for wobble detection. This feature is explained as follows.

As described above, in the DVD-R/RW format, guiding grooves for recording information are wobbly formed. To see locally, the position of the optical head 203 displaces from the track center by a predetermined frequency for the track. Consequently, amount of the light impinging on the tracking detectors while information is being recorded causes imbalance and recorded signals are mixed with address signals.

Conventionally, differential balance was adjusted in such a manner that the average light amount equally impinges on the two tracking detectors with an average amount. With this differential balance, wobble can be detected by using the amplitude center of the differential output. However, it was difficult to detect land pre-pits. The reason is that since the land pre-pit is recorded at the position where the optical head is relatively tracked off because of the wobble arrangement, mixing of recorded signals at the recording position becomes maximized (see waveform during recording of FIG. 9C), and the land pre-pit is unable to be identified (see waveform during recording of FIG. 9F).

Therefore, in the land pre-pit recording position, detecting recorded signals in the amplitude detecting circuit and adjusting two differential balance outputs to become substantially equal can adjust the mixing amount to become minimized at the land pre-pit recording position. That is, the land pre-pit detection ratio can be improved.

Note that in the differential balance output adjusted in such a manner, jitters are increased in the binary-coded wobble signal and they are not preferred for the binarized wobble signal. To explain the wobble binary-coding, it is common to adopt a method for binarizing the wobble signal at a predetermined slice level after it passes the band pass filter, or a duty feedback slice method that achieves 50% duty ratio of the binary-coded signal. However, even if either method is adopted, jitters in the binary-coded. wobble signal increase when the vicinity of the amplitude center of the wobble signal is used to binarize the wobble signal after it is outputted from the band pass filter 207. The reason is that in the differential balance output for increasing the land pre-pit detection ratio, mixing of the recorded signal at the land pre-pit recording position becomes minimized, but in the vicinity of wobble signal slice level, the mixing amount of recorded signals conversely increases.

Examining the above results indicates that the optimum adjustment point would differ in the differential balance adjustment of wobble detection and the differential balance adjustment of land pre-pit detection.

Therefore, the optical disc recording and reproducing apparatus 10 is separately equipped with the wobble detection balance adjusting circuit 225 for adjusting the outputs of the two detectors for wobble detection and the LPP detection balance adjusting circuit 226 for adjusting for land pre-pit detection. Furthermore, the two differential amplifiers, namely, the wobble signal detection differential amplifier 206 and the LPP detection differential amplifier 227, for outputting the differential signal of two outputs of the balance adjusting circuits 225, 226 are installed separately. By configuring in this way, both the wobble signal and land pre-pit can be precisely detected and an optical disc recording and reproducing apparatus with high reliability can be obtained. In addition to installing two differential amplifiers, the AGC circuit 230 and the amplitude detecting. circuit 229 are also newly installed. Functions of these components will be described later.

Referring now to FIGS. 3A–3K, the operation of the optical disc recording and reproducing apparatus 10 will be described in detail. The waveforms on the left side of FIGS. 3A–3H show the waveform of each section when an unrecorded track is reproduced. The waveforms on the right side of FIGS. 3A–3H show the waveform of each section during recording.

Referring now the waveforms on the left side of FIGS. 3A–3H, the operation will be described. FIGS. 3A and 3B show output signals of the LPP detection balance adjusting circuit 226 (FIG. 1) outputted based on the incident light amount signals from the tracking detectors A and B (FIG. 2). Because the tracking detectors A and B (FIG. 2) detect the same light in the spot form, the outputs have a relationship in that as one light amount increases, the other light amount decreases. Though the detection level differs, both detectors detect the land pre-pit. FIG. 3C shows the amplitude detection timing signal. The section in which the amplitude detection timing signal is "1" is the sampling section and the section "0" shows the hold section. The signal amplitude detected is connected to the A/D input of CPU 224 (FIG. 1). CPU 224 (FIG. 1) reads the signal amplitude value at the predetermined phase position of wobbles where the LPP address is recorded.

The amplitude detecting circuit 229 (FIG. 1) detects amplitude using a peak/bottom detecting circuit which has a time constant that can detect upper/lower envelopes of the input signal even when recorded signals are mixed, low pass filter (LPF) that removes the LPP address component and detects and smoothes modulated components by wobbles, and a sample-hold circuit that samples/holds the low pass filter outputs. In FIG. 1, the low pass filter and the sample-hold circuit are installed in the amplitude detecting circuit 229 and are not illustrated.

After detecting, when the amplitude is detected in the vicinity of the position where the LPP address is formed by the output of the amplitude detecting circuit 229 (FIG. 1), CPU 224 (FIG. 1) changes-the balance of the LPP balance adjusting circuit 226 (FIG. 1) so that the signal amplitude level at the position becomes substantially equal. In FIGS. 3A and 3B, the adjustment is made in such a manner that the high-frequency signal components shown in the level between the upper/lower envelopes of the input signal become substantially equal. However, when the unrecorded track is reproduced, it is detected as nearly 0. More detailed processing will be described in the processing during recording.

FIG. 3D shows differential signals generated by the LPP detection differential amplifying circuit 227 (FIG. 1) and allowed to pass the low pass filter 212. For the detection level for detecting the land pre-pit address signal, the signal amplitude of the wobble signal extracted by the band pass filter 207 is detected by the amplitude detecting circuit 210, and a voltage level obtained by adding a predetermined voltage value generated in the bias generating circuit 211 to the amplitude voltage is adopted (FIG. 3D) to obtain the land pre-pit binary-coding signal (FIG. 3E). The LPP address detecting circuit 214 demodulates and detects the land pre-pit address based on the land pre-pit address signal, wobble binary-coded signal (FIG. 3K), and the clock signal generated at the wobble PLL. Wobble binary-coding will be later discussed.

The waveforms on the right side of FIGS. 3A–3H indicate waveforms of all the sections during recording by the optical disc recording and reproducing apparatus 10. Same as reproducing, during recording, the balance is adjusted in such a manner that the amplitude levels detected from upper/lower envelopes of the two output signals of the LPP detection balance adjusting circuit 226 (FIG. 1) become substantially equal. The amplitude level is made equivalent at a predetermined phase position of the wobble signal where the LPP address is recorded. FIG. 4 shows two output signals of the LPP detection balance adjusting circuit. 226 (FIG. 1). CPU 224 (FIG. 1) adjusts the amplitude level so that the amplitude levels, a and b outputted from the upper/lower envelopes become substantially equal.

Referring now again to FIGS. 3A and 3B, the explanation will be made. FIGS. 3A and 3B show output signals of the LPP detection balance adjusting circuit 226 (FIG. 1 Y based on the input signals from two tracking detectors A and B (FIG. 2). In addition, FIG. 3D shows the waveform obtained after the output signal of the LPP detection balance adjusting circuit 226 (FIG. 1) passes the LPP detection differential amplifying circuit 227 (FIG. 1) and low pass filter 212 (FIG. 1). As clear from FIG. 3D, it is understood that the balance of the signals entered in the LPP detection differential amplifier 227 (FIG. 1) are adjusted in such a manner that the signal amplitudes in the vicinity of the LPP address signal become substantially equal. Furthermore, at the section where the wobble signal is 180 degrees out-of-phase (valley portion of the signal), mixing of recorded signals becomes maximized. On the other hand, in the vicinity of LPP address signal, the mixed components of recorded signals become minimized, the LPP address signal can be definitely detected using the LPP detection level shown with a dotted line. Consequently, the address detection ratio can be remarkably improved.

Next, a description will be made of the detection of the wobble signal. The balance adjustment of the differential amplifier for wobble signal detection is carried out in such a manner that the light amount entered in the two tracking detectors becomes substantially equal. First of all, CPU 224 (FIG. 1) detects amplitudes at the amplitude detecting circuit 229 (FIG. 1) during recording/reproducing, and adjusts the balance so that the amplitude values (signal levels) become substantially equal. Two signals are inputted to the wobble detection differential amplifying circuit 206 (FIG. 1). In such event, the signal selector switch 228 (FIG. 1) switches in such a manner that the output of the wobble detection balance adjusting circuit 225 (FIG. 1) is entered in the amplitude detecting circuit 229 (FIG. 1). As a result, the amplitude detecting circuit 229 (FIG. 1) detects the amplitude. In such event, the gate signal generating circuit 223 (FIG. 1) keeps the detection timing signal constantly to "1" so that the average light amount can be detected. The CPU 224 detects amplitudes an optional number of times, further carries out averaging processing, etc., and adjusts the signal balance so that the amplitude values become substantially equal.

FIGS. 3F and 3G show the output (solid line) of the wobble detection balance adjusting circuit 225 (FIG. 1) and the amplitude level (doffed line). detected by CPU 224 (FIG. 1) through amplitude averaging processing. CPU 224 (FIG. 1) adjusts the output of the wobble detection balance adjusting circuit 225 (FIG. 1) based on the amplitude values (signal level) found by the averaging processing shown in the dotted line. By adjusting the balance, the averages of light amount detected by each detector are substantially equalized, and as a result, in the vicinity of the center of the wobble signal amplitude close to the wobble binary-coded level, the mixing- of recorded signals during recording becomes minimized. FIG. 3H shows the sample-hold signal. This sample-hold signal is a constantly high-level signal.

FIG. 31 shows output signals of the wobble detection differential amplifier circuit 206 (FIG. 1) at the time of reproduction/recording. This output signal has the wobble signal component further extracted by the band pass filter 207 (FIG. 1) and is binary-coded by the wobble signal binary-coding circuit 208. FIG. 3J shows the output signal waveform of the band pass filter and FIG. 3K shows the binary-coded signal.

Because when the signal-to-noise ratio (SIN ratio) of the wobble signal is comparatively good, it is assumed that the increase of jitters is not conspicuous, and the output of the LPP detection differential amplifying circuit 227 may be entered directly in the band pass filter 207. In such event. since the components of the wobble detection balance adjusting circuit 225 and the wobble detection differential amplifier 206 can be omitted, the circuit configuration can be simplified from the configuration shown in FIG. 1.

In the description made to this point, the reproducing operation of the unrecorded track and the recording operation of the information have been described. Referring now to FIGS. 5A–5G the recorded track reproducing operation by the optical disc recording and reproducing apparatus 10 (FIG. 1) will be described. The reproducing operation of the recorded track is basically same as the recording operation of information. When the LPP detection balance adjusting circuit 226 (FIG. 1) operates, the signal selector switch 228 (FIG. 1) switches in such a manner that the output of the LPP detection balance adjusting circuit 226 (FIG. 1) is entered in the amplitude detecting circuit 229 (FIG. 1). In such event, the gate signal generating circuit 223 (FIG. 1) generates sample/hold pulses so that the amplitudes in the vicinity of the LPP address recording position can be detected.

CPU 224 adjusts the LPP detection differential balance adjusting circuit 226 (FIG. 1) so that the amplitude levels between upper/lower envelopes of the input signals shown in FIGS. 5A and 5B equal based on the output signal of the amplitude detecting circuit 229 (FIG. 1). Then, in adjusting the wobble signal detection differential balance adjusting circuit, the signal selector switch 228 (FIG. 1) switches the output of the wobble detection balance adjusting circuit to be entered in the amplitude detecting circuit 229 (FIG. 1). The gate signal, generating circuit 223 (FIG. 1) sets the output signal to "1" in order to detect the average light amount. CPU 224 (FIG. 1) carries out amplitude detection and averaging processing, and adjusts the signal balance so that the amplitudes become substantially equal in accordance with the amplitude values obtained.

The differential. balance for LPP detection is adjusted so that the high-frequency signal component amplitude in the vicinity of the LPP address signal recording position becomes substantially equal even during reproduction. However, this adjusting position differs from the adjusting position during recording. The reason is that, during recording, power of the laser which is the light source of the optical head 203 becomes of a high output and this modulated light is reflected at the disc and returns and mixes in the LPP address signal, whereas, during reproducing the recorded tracks, marks recorded in the disc groove are mixed as reproduction signals.

Figure 6:
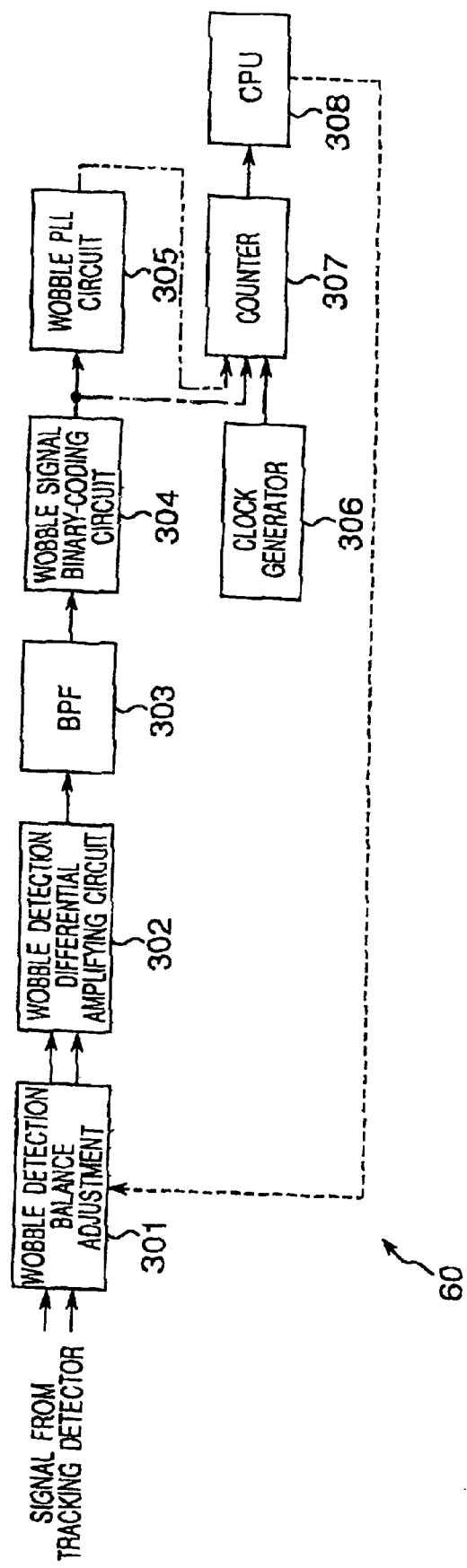
FIG. 6 is a partial block diagram of an optical recording and reproducing apparatus in an embodiment of the present invention.

Referring now to FIG. 6, another balance adjustment example utilizing the wobble detection differential balance circuit will be described. FIG. 6 shows a wobble detection balance adjusting route 60. The wobble detection balance adjusting route 60 includes a wobble detection balance adjusting circuit 301 for adjusting signal balance, a differential amplifying circuit 302 for generating a wobble signal based on the output signal of the balance adjusting circuit 301, a band pass filter 303 for extracting wobble signal components based on the output signal of the differential amplifying circuit 302, a wobble signal binary-coding circuit 304 for binarizing the wobble signal, which is the output signal of the band pass filter 303, a wobble PLL circuit 305 for generating clocks required for disc recording/reproducing based on the wobble binary-coded signal, a clock generator 306 for generating docks for detecting the cycle or the frequency of the wobble binary-coded signal, a counter 307 for detecting the cycle or the frequency of the wobble signal binary-coded output using clocks generated by the clock generator 306, and CPU 308 for reading the count value of the counter 307 and measuring the wobble cycle or frequency.

Now, by the above-mentioned configuration, the principle of detecting and measuring the jitter amount of the wobble signal and the adjustment method will be discussed. During recording operation or reproducing operation of the optical disc recording and reproducing apparatus 10 (FIG. 1), CPU 308 sets predetermined setting value(s) to the wobble detection balance adjusting circuit 301. This value may be the center of electrical balance or a settable minimum value. In this event, CPU 308 measures the wobble binary-coded signal cycle (cycle of signal of the signal line shown by an alternate long and short dash line in the figure) detected by the counter 307 in an optional number of times and calculates the dispersion amount. The value is temporarily stored in a storage section (not illustrated) in the CPU 308. CPU 308 sets the next value to the wobble detection balance adjusting circuit 301 and stores the dispersion amount of the wobble binary-coded signal at this time in a different region of the storage section in the same manner. This operation is carried out on all the settings of the wobble detection balance adjusting circuit 301, and the value which minimizes the dispersion amount of the wobble binary-coded signal is set as the optimum setting.

As a result of adjusting the balance of the signal in this way, mixing of the recording signal or recorded information signal, becomes minimized. Consequently, if the wobble binary-coded level is assumed to be detected at an ideal value (50%) of the signal amplitude with respect to the output signal of BPF 303, the average light amount detected values of two input signals to the wobble detection differential amplifying circuit 302 are adjusted to be substantially equal. In the present case, the jitter amount of the wobble binary-coded signal was monitored. Alternatively, using the wobble PLL circuit 305, the jitter amount of the subharmonic signal of the output clock titter of the cycle of the signal shown with the alternate long and two short dashes line in the figure) may be measured. The subharmonic signal is synchronized to the wobble binary-coded signal and is entered in the PLL phase comparator In addition, when the PLL circuit can generate a sufficiently stable clock as compared to the jitter of the wobble binary-coded signal, it is possible to monitor the jitter amount of the wobble signal by monitoring the time difference dispersion between the binary-coded signal of wobble entered in the phase comparator of the wobble PLL circuit 305 and the subharmonic signal of the output clock of the PLL circuit (i.e., time difference dispersion between the signal of the signal line shown by an alternate long and short dash line and the signal of the signal line shown by an alternate long and two short dashes line in the figure).

For calculating the dispersion amount, methods for using the average cycle, standard deviations, etc. are assumed. Furthermore, it has been described that for the search of the optimum setting, all the settings are carried out, but in actuality, using the binary search method, etc., the optimum settings can be sought in the minimum time; or using the process adjustment values, etc. at the time of manufacturing the apparatus, the settings can be sought still more efficiently.

In addition, for the measurement clock, a clock generator is newly used. However, clocks of the wobble PLL circuit 305 are comparatively stable against the wobble binary-coded signal, the PLL circuit clock may be used in place of clocks generated by the clock generator.

Referring now to FIG. 7, another balance adjustment example utilizing the wobble detection differential balance circuit and LPP detection balance adjusting circuit will be described. FIG. 7 shows a wobble and LPP detection balance adjusting route 70. The wobble detection balance adjusting route (upper column) of the wobble and LPP detection balance adjusting route 70 includes a wobble detection balance adjusting circuit 401 that carries out balance adjustment of signals entered in the wobble detection differential amplifying circuit, wobble detection differential amplifying circuit 402 for generating the wobble signal from output signals of the balance adjusting circuit 401, a band pass filter 403 for extracting wobble signal components from the output signal of the differential amplifying circuit, a wobble signal binary-coding circuit 404 for binarizing the wobble signal which is the output signal of the band pass filter 403, a wobble PLL circuit 405 for generating clocks required for carrying out recording/reproducing of the same disc from the wobble signal binary-coded signal, a clock generator 406 for generating clocks for detecting a cycle or frequency of wobble binary-coded signal, a counter 407 for detecting the time intervals of the wobble signal binary-coded output from pulse signal detected by the LPP detecting circuit 414, and CPU 408 for reading the count value of the counter 407 and measuring a cycle or frequency of wobble.

Furthermore, of the wobble and LPP detection balance adjusting route 70, the LPP detection balance adjusting route (lower column) includes an LPP address detection balance adjusting circuit 409 for carrying out balance adjustment of signals entered in an LPP address detection differential amplifying circuit 410, the LPP detection differential amplifying circuit 410 for generating an LPP address signal from output signals of the balance adjusting circuit, a low frequency component extraction low pass filter 411 for detecting the land pre-pit address from the output signals of the differential amplifying circuit 410, an amplitude detecting circuit 412 for detecting amplitudes of the wobble signal extracted at the band pass filter 403, a bias generating circuit 413 for generating the bias voltage, a land pre-pit detecting circuit 414 for detecting a land pre-pit address signal based on a certain voltage level as a comparison level, which is obtained by adding a generated voltage from the bias generating circuit 413 and the amplitude signal of the wobble signal, and a land pre-pit address detecting circuit 415 for detecting the land pre-pit address from the land pre-pit binary-coded signal detected at the land pre-pit detecting circuit 414.

Now, discussion will be made on another example of balance adjustment by the above-mentioned configuration. Wobble detection balance adjustment and detection are carried out as described. The binary-coded wobble signal and LPP address signal are entered into the counter 407 by the above-mentioned configuration. The counter 407 measures the wobble binary-coded signal time intervals from the binary-coded signal of the LPP address by clocks generated by the clock generator 406. The CPU 408 can read the value. CPU 408 measures this time interval at an optional number of times for each setting of the wobble detection balance adjusting circuit. The CPU 408 calculates the dispersion amount in the same manner as described in the preceding examples. Because the binary-coded signal of the LPP address is the pulse-form detection signal as shown in FIG. 5G the LPP address can be stably detected even against a slight setting deviation of the LPP detection balance. Consequently, there is no problem in using the LPP address binary-coded signal as the reference signal for detecting jitters of the wobble signal.

Furthermore, in this example, there described is a method for carrying out the wobble detection balance adjustment by measuring the jitter amount of the wobble binary-coded signal based on the binary-coded signal of the LPP address. However, for alternative signals of LPP address binary-coded signals, the address is further detected and decoded at the LPP address detection circuit 415, and the address detection verification signal generated in such event can be used. However, in such event (particularly, during recording. of the optical disc recording and reproducing apparatus 10 (FIG. 1)), it is desirable that the LPP detection balance adjustment would have been completed.

In addition, when balance adjustment of the wobble balance adjusting circuit 401 is unable to be satisfactorily carried out, the jitter amount of the wobble binary-coded signal is large and the wobble PLL circuit 405 on the latter part may be unable to properly generate the clocks in synchronization with the wobble binary-coded signal and LPP address may be unable to be detected. However, making the best of this, it is possible to adjust the wobble detection balance adjusting circuit while monitoring the address detection ratio at the LPP address detecting circuit 415 by the CPU 408.

As described above, by adjusting the wobble detection differential balance adjusting circuit and the LPP detection differential balance adjusting circuit, an optical disc apparatus that can stably detect the LPP address during both data recording and reproducing can be achieved.

When the detector 203a (FIG. 2) is divided into two or more (for example, 4 pieces, 6 pieces of) detectors, the output of the detector on one side of the parting line along the track and the output of the detector on the other side are used. For example, the differential signal can be obtained as a difference between the average value of the output of the detectors existing on one side of the parting line and the average value of the output of the detectors existing on the other side.

It will be obvious that the invention being thus described may be varied in many ways. Such variations are not to be regarded as a departure from the spirit and scope of the invention, and all such modifications as would be obvious to one skilled in the art are intended to be included within the scope of the following claims.

What is claimed is:

1. An optical apparatus for reading address information from an optical disc which has tracks for recording information and track spaces, formed between the tracks, on which the address information to identify a position on the optical disc is recorded, said optical apparatus comprising:

an optical head for irradiating the optical disc with light, said optical head including a first detector and a second detector located to be along the tracks, said first detector and said second detector for detecting the light reflected from the optical disc and outputting a first detection signal, and a second detection signal respectively;

a balance adjusting circuit for address detection for receiving the first detection signal outputted by said first detector and the second detection signal outputted by said second detector, said balance adjusting circuit for address detection adjusting amplitudes of the first detection signal and the second detection signal and outputting an adjusted first detection signal and an adjusted second detection signal, respectively, at a position where the address information is recorded;

an address detection differential amplifying circuit for outputting an address detection differential signal which is a difference between the adjusted first detection signal and the adjusted second detection signal adjusted by said balance adjusting circuit for address detection; and an address detecting circuit for detecting the address information based on the address detection differential signal outputted from said address detection differential amplifying circuit.

2. The optical disc apparatus according to claim 1, further comprising:

an amplitude detecting circuit for detecting the amplitudes of the first detection signal and the second detection signal, wherein said balance adjusting circuit for address detection adjusts the amplitudes of the first detection signal and the second detection signal to become substantially equal based on the amplitudes of the first detection signal and the second detection signal detected by said amplitude detecting circuit, and outputs the adjusted first detection signal and the adjusted second detection signal.

3. The optical disc apparatus according to claim 1, further comprising:

a detecting section for detecting a reading ratio of the address information, wherein said balance adjusting circuit for address detection adjusts the amplitudes of the first detection signal and the second detection signal to maximize the reading ratio detected by said detecting section.

4. The optical disc apparatus according to claim 2, wherein the optical disc has wobbles formed in a radial direction at a predetermined cycle to be used for controlling rotation of the optical disc, and said optical disc apparatus further comprises:

a balance adjusting circuit for wobble detection for receiving the first detection signal and the second detection signal, adjusting signal levels of the first detection signal and the second detection signal to be substantially equal, and outputting a first adjusted detection signal and a second adjusted detection signal;

a wobble detection differential amplifying circuit for outputting a wobble detection differential signal, which is a difference between the first adjusted detection signal and the second adjusted detection signal adjusted by said balance adjusting circuit for wobble detection; and a wobble signal detection circuit for detecting a wobble based on the wobble detection differential signal outputted from said wobble detection differential amplifying circuit.

5. The optical disc apparatus according to claim 4, wherein said balance adjusting circuit for wobble detection adjusts the signal level of the first detection signal and the signal level of the second detection signal and minimizes a jitter amount based on the jitter amount of the wobble detected by said wobble signal detection circuit.

6. The optical disc apparatus according to claim 4, further comprising:

a detection section for detecting a reading ratio of the address information, wherein said balance adjusting circuit for wobble detection adjusts the signal levels of the first detection signal and the second detection signal to maximize the reading ratio detected by said detection section.

7. The optical disc apparatus according to claim 4, further comprising:

a gain control circuit for making the amplitudes of the first detection signal and the second detection signal constant.

8. A method for reading address information from an optical disc which has tracks for recording information and track spaces, formed between the tracks, on which the address information to identify the position on the optical disc is recorded, said method comprising:

irradiating the optical disc with light;

detecting the light reflected from the optical disc and outputting a first detection signal and a second detection signal detected by a first detector and a second detector, respectively, in a track direction;

receiving the first detection signal outputted by the first detector and the second detection signal outputted by the second detector;

adjusting amplitudes of the first detection signal and the second detection signal;

outputting an adjusted first detection signal and an adjusted second detection signal, respectively;

outputting an address detection differential signal which is a difference between the adjusted first detection signal and the adjusted second detection signal; and detecting the address information based on the outputted address detection differential signal.

* * * * *

UNITED STATES PATENT AND TRADEMARK OFFICE
CERTIFICATE OF CORRECTION

PATENT NO. : 6,912,190 B2
DATED : June 28, 2005
INVENTOR(S) : Chikashi Inokuchi et al.

It is certified that error appears in the above-identified patent and that said Letters Patent is hereby corrected as shown below:

Title page,
Item [75], Inventors, correct the fifth inventor's name to -- Mitsuhiko Ohta --.
Item [56], References Cited, FOREIGN PATENT DOCUMENTS, the fourth reference should read as follows:
-- JP     2-118923        5/1999 --.

Column 15,
Line 32, replace "signal, and a second detection signal respective;" with -- signal and a second detection signal, respectively; --.

Column 16,
Line 32, replace "4." with -- 4, --.

Signed and Sealed this

Twenty-seventh Day of December, 2005

JON W. DUDAS
*Director of the United States Patent and Trademark Office*